(12) United States Patent
Hermey et al.

(10) Patent No.: US 10,862,290 B2
(45) Date of Patent: Dec. 8, 2020

(54) LINE GUIDE DEVICE HAVING A MOVEMENT SENSOR AS WELL AS A DRIVE ARRANGEMENT AND WINDING APPARATUS HAVING SUCH A LINE GUIDE DEVICE

(71) Applicant: igus GmbH, Cologne (DE)

(72) Inventors: Andreas Hermey, Hennef (DE); Georg Theiss, Cologne (DE); Thilo-Alexander Jaeker, Sankt Augustin (DE); Philip Howold, Frechen (DE)

(73) Assignee: igus GmbH, Cologne (DE)

( * ) Notice: Subject to any disclaimer, the term of this patent is extended or adjusted under 35 U.S.C. 154(b) by 229 days.

(21) Appl. No.: 15/548,316

(22) PCT Filed: Feb. 1, 2016

(86) PCT No.: PCT/EP2016/052074
§ 371 (c)(1),
(2) Date: Aug. 2, 2017

(87) PCT Pub. No.: WO2016/124546
PCT Pub. Date: Aug. 11, 2016

(65) Prior Publication Data
US 2018/0026432 A1      Jan. 25, 2018

(30) Foreign Application Priority Data

Feb. 2, 2015    (DE) .................... 20 2015 100 484 U (51) Int. Cl.
*H02G 11/02*          (2006.01)
*B65H 75/44*          (2006.01)
(Continued)

(52) U.S. Cl.
CPC .......... *H02G 11/02* (2013.01); *B65H 75/4486* (2013.01); *F16G 13/16* (2013.01); *B65H 2403/46* (2013.01); *H02G 11/006* (2013.01)

(58) Field of Classification Search
CPC .......... F16G 13/00; F16G 13/12; F16G 13/16; H02G 11/00; H02G 11/006; H02G 11/02
See application file for complete search history.

(56) References Cited

U.S. PATENT DOCUMENTS

| 6,057,682 A | 5/2000 | McCurley et al. |
| 2015/0330479 A1 | 11/2015 | Kemper et al. |
| 2016/0348757 A1 | 12/2016 | Jaeker et al. |

FOREIGN PATENT DOCUMENTS

| DE | 1117190 A | 11/1961 |
| DE | 1250231 B | 9/1967 |

(Continued)

*Primary Examiner* — Robert J McCarry, Jr.
(74) *Attorney, Agent, or Firm* — Cahn & Samuels, LLP (57) ABSTRACT

The invention concerns line guide devices, for example energy guide chains (31, 51), having a movement sensor. An aspect concerns a movement sensor (10; 20) including a bearing having a first component, for example a guide (11; 21) of a linear bearing, and a second component moveable relative thereto, for example a longitudinally displaceable slider (12; 22), and at least one pick-up (13, 14; 23, 24) whose output signal depends on the relative position of both components. The movement sensor (10; 20) can be arranged with the first component at the connecting location to be supplied and with the second component at the moveable end of the line guide device, or vice-versa. A further aspect concerns an apparatus (30; 40) for winding up and unwinding a line guide device. A rotatable drum (32; 42) for winding up and unwinding the line guide device has a drum drive (38; 48). A sensor unit (35; 45) is arranged at the load-side end region (52B) of the line guide device, for detecting a movement parameter. A control unit (36; 46)

(Continued)

connected to the sensor unit (35; 45) controls the drum drive. Both aspects are suitable inter alia for shore power supply.

23 Claims, 5 Drawing Sheets

(51) Int. Cl.
  *F16G 13/16* (2006.01)
  *H02G 11/00* (2006.01)

(56) References Cited

FOREIGN PATENT DOCUMENTS

| | | | | | |
|---|---|---|---|---|---|
| DE | 2410835 | A1 | 9/1975 | | |
| DE | 20305619 | U1 | 8/2003 | | |
| DE | 202011107804 | | * 12/2011 | ............ | F16G 13/16 |
| DE | 202011107804 | U1 | 12/2011 | | |
| DE | 102012110967 | A1 | 5/2013 | | |
| DE | 202014100540 | | * 3/2014 | ............ | F16G 13/16 |
| DE | 202014100540 | U1 | 3/2014 | | |
| EP | 0518292 | A1 | 12/1992 | | |
| WO | 2009095470 | A1 | 8/2009 | | |
| WO | 2014102170 | A1 | 7/2014 | | |

\* cited by examiner

LINE GUIDE DEVICE HAVING A MOVEMENT SENSOR AS WELL AS A DRIVE ARRANGEMENT AND WINDING APPARATUS HAVING SUCH A LINE GUIDE DEVICE

This application is the National Stage of International Application No. PCT/EP2016/052074, filed on Feb. 1, 2016, which claimed the benefit of German Application No. DE 20 2015 100 484.2 filed Feb. 2, 2015, which are hereby both incorporated by reference.

The invention generally concerns a line guide device, in particular an energy guide chain, having a movement sensor. The invention also concerns an arrangement for line guidance including a drive for supporting the forward and/or return movement of the line guide device, a control unit for actuating the drive and a sensor unit for detecting a movement parameter of the line guide device. The invention further concerns an apparatus for winding up and unwinding a line guide device of the general kind set forth and the use thereof for shore power supply (referred to as shore power/alternative maritime power), or also for supplying underground works equipment.

Line guide devices, for example of an energy guide chain, are generally known and serve for protecting and guiding lines, cables, hoses or the like between a first connecting location and a second connecting location which is moveable relative thereto on a load like for example a moveable machine component. It is also known for energy guide chains to be equipped with certain sensor technologies. Thus for example patent application WO 2009/095470 A1 describes a force measuring sensor on an entrainment member of a particular configuration, and a unit for monitoring the tensile and thrust forces exerted on the energy guide chain in order possibly to avoid a chain breakage. It will be noted however that that sensor technology is not directly suitable for actuating a drive for the automatic movement of the energy guide chain or is rather complicated and expensive.

Patent application WO 2014/102170 A1 describes a particular arrangement for line guidance including such an energy guide chain and a drive which is operatively connected to the energy guide chain for assisting with the forward and/or return movement of the energy guide chain. For actuating the drive there is proposed a control unit which is connected in signal-communicating relationship with a sensor unit for detecting a movement parameter at the moveable end region of the energy guide chain. In this connection, in particular in relation to FIG. 11 thereof, WO 2014/102170 A1 describes an energy guide chain having a coupling device connected to a first entrainment member on a machine component. The coupling device has at least one sensor, for example a travel sensor. The coupling device is connected to a second entrainment member on the actual energy guide chain. The coupling device can have a portion of a further energy guide means, as a movement buffer. The first entrainment member is reciprocatingly displaceable in the longitudinal direction relative to the second entrainment member. The travel sensor supplies a signal to a control means in dependence on the relative displacement travel of the first entrainment member. The control means activates or deactivates a drive device for assisting with the movement of the moveable run of the energy guide chain.

The structure of that coupling device with travel sensor is also complicated and expensive, in addition it is relatively large and it is not suitable for all situations of use.

A possible use of a drive-supported line guide device is known from patent application DE 10 2012 110 967 A1. Described therein is an apparatus for winding up and unwinding an energy guide chain, comprising a rotatably mounted drum for winding up and unwinding the line guide device and a drum drive for rotating the drum. The energy guide chain is unwound from the drum in the unwinding direction and wound on to the drum in opposite relationship to the unwinding direction, by the motor drum drive. DE 10 2012 110 967 A1 however does not specify how the drum drive is to be controlled.

An underground works tool having an apparatus for winding up and unwinding a line guide device, the winding and unwinding of which is not motor-assisted, is described in patent application EP 0 518 292 A1. In comparison with the complicated and expensive structure of the line guide means, that is proposed there, it would be possible to design a line guide means which is assisted by a drive, for a markedly lower tensile and thrust loading, and the line guide means could thus be markedly simplified.

Taking the above-mentioned state of the art as the basic starting point, a first object of the invention is to propose a simple, compact and robust structure of a movement sensor for detecting a movement parameter of a line guide device, as well as a line guide arrangement equipped therewith. The latter is to be suitable in particular both for vertical and also for horizontal applications.

A second, possibly independent object is that of equipping an apparatus for winding up and unwinding a line guide device with a simple control means which in particular is suitable for use with heavy lines, for example in the shore power supply of ships or however also for use in underground works machines.

In a particularly simple embodiment the first object is attained in that, in a line guide device including a movement sensor for protectedly guiding lines, cables, hoses or the like between a first connecting location and a second connecting location moveable relative thereto, and the movement sensor has a bearing having a first component and a second component moveable relative thereto, and at least one pick-up whose output signal depends on the relative position of the second component in relation to the first component. Depending on the respective configuration of the movement sensor the first component can be fixed to the second connecting location and the second component can be fixed to the corresponding moveable end of the line guide device, or vice-versa. The bearing can be in particular in the form of a linear bearing, that is to say the movement sensor includes a guide, a slider longitudinally displaceable in the guide and at least one pick-up whose output signal depends on the position of the slider relative to the guide. The movement sensor can be of such a configuration that the guide can be fixed to the second connecting location and the slider can be fixed to the moveable end, that is to be connected thereto, of the line guide device. The mechanically equivalent reverse configuration is also in accordance with the invention, that is to say it is to be fixed with the slider to the entrainment member or is to be integrated into same and is to be fixed to the guide at the moveable end region of the line guide device.

The bearing can also be in the form of a rotary bearing or radial bearing, for example with a pivot arm which is mounted rotatably to the first component and the rotational position of which indicates the direction of movement. In the case of a movement sensor with a rotary bearing for determining the position, it is already possible to achieve precise regulation of the relative position or the movement of the moveable end region, using a conventional potentiometer.

The guide can form a displaceable and floating bearing arrangement, in particular a plain bearing arrangement, of the slider, and can mount same in substantially play-free relationship in the two directions perpendicular thereto. The longitudinal direction can correspond in particular to the direction of displacement of the second connecting location or the moveable end of the line guide device, which typically coincides with the longitudinal extent of that end region of the line guide device.

Herein the term movement sensor is used to denote any device which converts a spatial movement or change in position into an electromagnetic value which can be evaluated with a suitable circuit. In particular the direction and/or the extent of a spatial change in position is interpreted as the movement parameter.

In a mechanically simple configuration the at least one pick-up is mounted to the slider or to the guide or, in the case of a multi-part structure, possibly to both.

An embodiment which is particularly simple in terms of measurement technology includes at least or precisely two pick-ups, of which only a respective one responds upon approaching one of two end positions in the longitudinal direction. That can be particularly easily achieved by a first and a second contact-free proximity switch provided at a spacing in the longitudinal direction. That provides a particularly simple hysteresis sensor which indicates only the direction of movement of the moveable end of the chain. Electromagnetic pick-ups like for example inductive or capacitive pick-ups or magnetic pick-ups like for example a reed contact or a Hall sensor are considered as suitable proximity switches. An optical movement detection device is also in accordance with the invention, for example with light barriers and a position flag interrupting same. More complicated movement sensors are not required but would be considered to achieve more precise regulation if for example besides detecting direction, information relating to speed is also desired. Detecting direction can possibly also be implemented with a sensor component if that component has three suitably arranged Hall elements for signal offset. A ferromagnetic toothed rack, a stamped plate or a signaling device with magnetic poles alternating in the longitudinal direction can serve as the signaling device in the case of such sensors.

The line guide device or the movement sensor, in addition to the at least one pick-up, can have two limit switches at mutually opposite ends of the guide or the slider in order to indicate the attainment of a maximum longitudinal displacement. Thus for example an overloading on the line guide device can be implemented by an emergency stop of the moveable entrainment member or the second connecting location. In the case of particularly vulnerable or demanding line guide devices uncoupling of the line guide device from the second connecting location can also be considered. In that case the slider should be released from the guide in non-destructive fashion and the guided lines should be connected with an easily separable connection.

The above-mentioned configuration with the proposed movement sensor provides a simple and robust measuring member which can be connected to a control unit to actuate an adjusting member, for example one or more motor drives for relieving the load on or assisting with an energy guide chain as described in WO 2014/102170 A1. In that case the control unit, in accordance with regulating technology, can form a closed-loop control with feedback or possibly also a simple open-loop control.

Advantageously the signal lines, for example for connecting the movement sensor to a control unit and/or to an adjusting member, are guided to the stationary end of the line guide device, being protected by the device itself.

The control means which evaluates the signals from the movement sensor can be arranged either at the fixed point or at the moveable load. The latter is advantageous in particular when the situation involves particularly long lines to be guided as the number of lines leading back from the second to the first connecting location can turn out to be less. For example a single data line may be sufficient if the control unit and/or the movement sensor can be fed by way of supply lines which are provided in any case. Data transmission by radio is also in accordance with the invention.

The movement sensor can be connected to a control unit which actuates a drive for assisting the line guide device, as an adjusting member. The control means preferably also triggers an emergency stop of the moveable load, which includes the second connecting location, if the movement sensor indicates the attainment of a maximum permissible longitudinal displacement between the guide and the slider, for example by means of suitable limit switches. That is particularly advantageous if the moveable end of the line guide device can be uncoupled or separated from the load for protection purposes.

Preferably the movement sensor can mechanically couple the load to the moveable end of the line guide device, similarly to an entrainment member, but with play or floatingly in the longitudinal direction. For that purpose, in particular at the guide or at the slider, it can have two end abutments for limiting the maximum longitudinal displacement and for the transmission of force between the two parts.

According to an aspect the invention concerns an arrangement for line guidance with an energy guide chain of the general kind set forth, a drive which assists the energy guide chain in its forward and/or return movement, a control unit for the drive as well as a sensor unit for detecting a movement parameter at the moveable end region of the energy guide chain. This aspect of the invention is characterized in that the sensor unit includes a movement sensor, having a guide, a slider longitudinally displaceable in the guide and at least one pick-up whose output signal depends on the position of the slider relative to the guide. In that case the movement sensor can be provided either stationary with the guide at the load and stationary with the slider at the moveable end or however stationarily with the guide at the moveable end and stationarily with the slider at the load.

In a configuration of that arrangement for line guidance the forward and/or return movement of the energy guide chain is effected substantially in a horizontal direction, wherein the energy guide chain forms a lower run, a direction-changing arc and an upper run, and the drive assists with the travel movement of the upper run and/or the direction-changing arc. That can be effected for example by means of a plurality of motor drives in a slide rail or by means of a motor-operated conveyor belt or the like. The chain itself can also be equipped with one or more drives in the region of the upper run, which drive it in the desired direction. In addition it is conceivable for the direction-changing arc to be assisted in its movement, in particular if there is already a direction-changing roller, by way of which the energy guide chain is changed in its direction.

In accordance with an independent further aspect the second object as referred hereinbefore is attained by an apparatus for winding up and unwinding a line guide device, in particular an energy guide chain, including a line guide device of the general kind set forth, a rotatably mounted drum for winding up and unwinding the line guide device, and a drum drive for rotating the drum. That aspect can be characterized in that arranged at the load-side end region of the line guide device is a sensor unit for detecting a movement parameter of the line guide device, and there is provided a control unit connected to that sensor unit and the drum drive for actuating the drum drive.

That arrangement makes it possible in a particularly simple fashion to achieve a reduction in the typical tensile and thrust forces in the line guide devices generally and in particular in an energy guide chain. The term drum is also used here to denote a winch or reel or any similar device suitable for winding up and unwinding a line guide device.

The apparatus for winding up and unwinding the drum can be designed in particular in accordance with the teaching of DE 10 2012 110 967 A1.

Particularly preferably but not necessarily the sensor unit includes a movement sensor in accordance with the first above-mentioned aspect of the invention, that is to say with a guide, a slider longitudinally displaceable in the guide and at least one pick-up whose output signal depends on the position of the slider relative to the guide.

The control unit can actuate the drum drive in regard to its direction of rotation and its rotary speed, and in particular can provide for closed-loop control thereof in such a way that the free end, which can be extended and retracted, of the line guide device, substantially synchronously follows a movement of the load.

In a simple configuration the drum drive includes an electric motor, for example a frequency-controlled electric motor like a three-phase asynchronous machine.

To prevent unwanted unwinding when the motor is stationary the drum drive preferably includes a self-locking transmission which is connected at the drive side to a motor and which is connected at the output side to the drum shaft or spindle. A worm transmission is particularly suitable as the self-locking transmission.

According to a further aspect of the invention this simplifies the supply of a ship tied up in port. By virtue of a shore power supply it is possible inter alia to avoid the ship generators being needed for power generation, that is to say a reduction in exhaust gas is achieved. In accordance with this further aspect of the invention it can be used in particular in the shore power supply of a deep-sea vessel. In that case the line guide device preferably has an energy guide chain which can be wound up and unwound for guiding the heavy-current cable.

The invention finally also concerns the use of the apparatus in accordance with the penultimate second aspect for supplying and possibly also disposing of a vertically displaceable underground work tool like for example a deep drilling head, a cutting head for decommissioning platform piers, a diaphragm wall cutter in accordance with EP 0518292 A1 or the like. In that case the underground works tool having the second connecting location is typically carried by a draw cable of a winch and moves predominantly vertically up and down by means of a winch drive. By virtue of the sensor unit proposed here and the control unit the drum drive can operate synchronously or quasi-synchronously with the winch drive without complicated and expensive control technology being required for that purpose.

Further details, features and advantages of the invention will be apparent from the more detailed description hereinafter of preferred embodiments by way of example with reference to the accompanying Figures. The Figures without limitation are diagrammatic views which are not true to scale.

Figure 1:
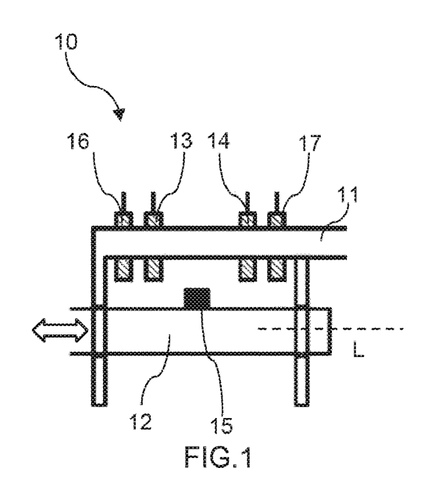
FIG. 1 shows a diagrammatic side view of a first embodiment of a movement sensor according to the first aspect of the invention.

FIG. 1 shows a first embodiment of a movement sensor 10. A slider 12 is mounted displaceably in the longitudinal direction L in a guide 11, for example by means of plain bearings. The bearings can be provided in coaxial openings at two mutually opposite holding arms of the guide 11, which are perpendicular to the longitudinal direction L, as indicated in FIG. 1. In FIG. 1 two pick-ups 13, 14 are mounted at a predetermined longitudinal spacing to the guide 11. Arranged approximately centrally on the slider 12 is a triggering element 15, for example a permanent magnet, which co-operates with the pick-ups 13, 14. The pick-ups 13, 14 can thus be in the form of contact-less proximity switches like reed contacts or the like.

If a load fixed to the guide 11 moves away the slider 12 is moved rearwardly relative to the guide 11 (towards the left in FIG. 1), that is to say the first pick-up 13 is then addressed. If the slider 12 moves forwardly (towards the right in FIG. 1) relative to the guide the second pick-up 14 is addressed. The direction of movement can thus be detected in a robust and particularly simple fashion as the output signal of the pick-ups 13, 14 depends on the relative position of the floatingly mounted slider 12 relative to the guide 11. In that respect it is immaterial whether the guide 11 is fixed at the load-side connecting location and the slider 12 at the corresponding moveable end of a line guide device (see FIGS. 3-4) or vice-versa, only the way in which the pick-ups 13 and 14 operate is correspondingly reversed.

Besides the pick-ups 13, 14 FIG. 1 additionally shows two limit switches 16, 17 at mutually opposite ends of the guide 11, just beside the holding arms. The limit switches 16, 17 operate in accordance with the same principle as the pick-ups, but display the attainment of a maximum desired longitudinal displacement, in accordance with which the spacing between the limit switches 16, 17 and thus the movement sensor 10 are to be dimensioned.

Figure 2:
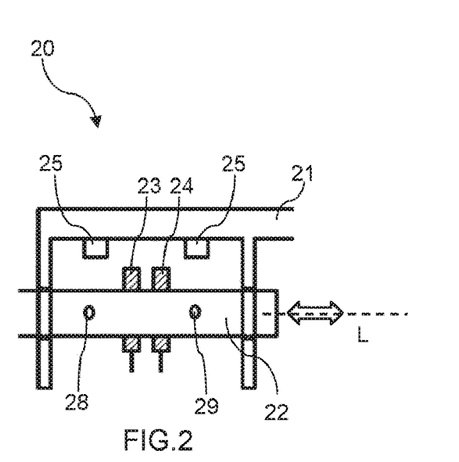
FIG. 2 shows a diagrammatic side view of a second embodiment of a movement sensor according to the first aspect of the invention.

FIG. 2 shows a second embodiment of a movement sensor 20 which differs from FIG. 1 essentially only in two aspects. The pick-ups 23, 24 for direction detection are here not mounted to the guide 21 but to the slider 22. Accordingly, two triggering elements 25 are provided at the end regions on the guide 21. The mode of operation of the pick-ups 23, 24 is however identical to that of the pick-ups 13, 14. A further difference is that the movement sensor 20 has end abutments 28, 29, for example transverse pins, which engage the holding arms. The end abutments 28, 29 limit the relative movement of the slider 22 in relation to the guide 21 and are optionally of a sufficiently strong nature to use the movement sensor 20 at the same time as an entrainment member with a floating mounting in the longitudinal direction L.

Figure 3:
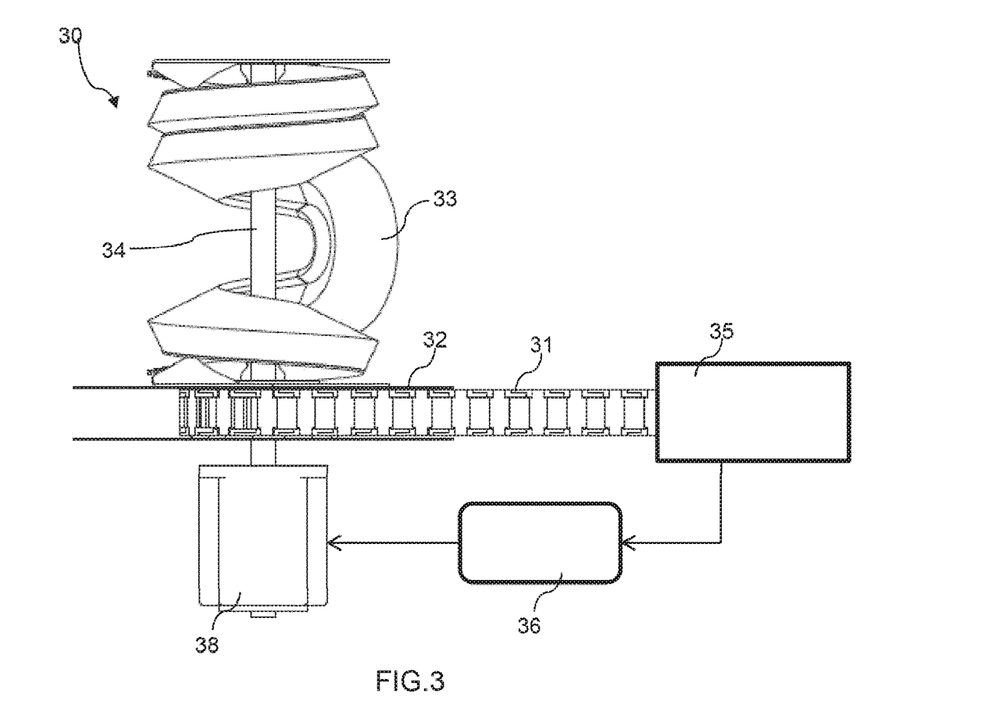
FIG. 3 shows a diagrammatic plan view of an embodiment of an apparatus for winding up and unwinding a line guide device according to the second aspect.

FIG. 3 shows an apparatus 30 for horizontally winding up and unwinding an energy guide chain 31 for protected guidance of lines, cables, hoses and the like (not shown in FIG. 3). The apparatus 30 includes a rotatably mounted drum 32 for winding up and unwinding the energy guide chain 31 with a suitable drum drive 38 for driving the drum. To avoid sliding contacts or the like the apparatus has a special spiral band 33 which connects the non-extendable end of the energy guide chain 31 to the fixed point. In that respect the apparatus 30 is designed substantially in accordance with DE 10 2012 110 967 A1.

A sensor unit 35 is provided for actuating and possibly for closed-loop control of the drum drive 38, at the extendable and retractable or load-side end region of the energy guide chain 31. The sensor unit 35 includes a movement sensor 10 or 20 as shown in FIG. 1 or 2 respectively, for detecting a movement parameter, in particular the direction of movement of the load (not shown in FIG. 3). A control unit 36 which is respectively connected in signal-communicating relationship to the sensor unit 35 and the drum drive 38 serves for actuation of the drum drive 38 in accordance with the detected movement parameter.

Figure 4A:
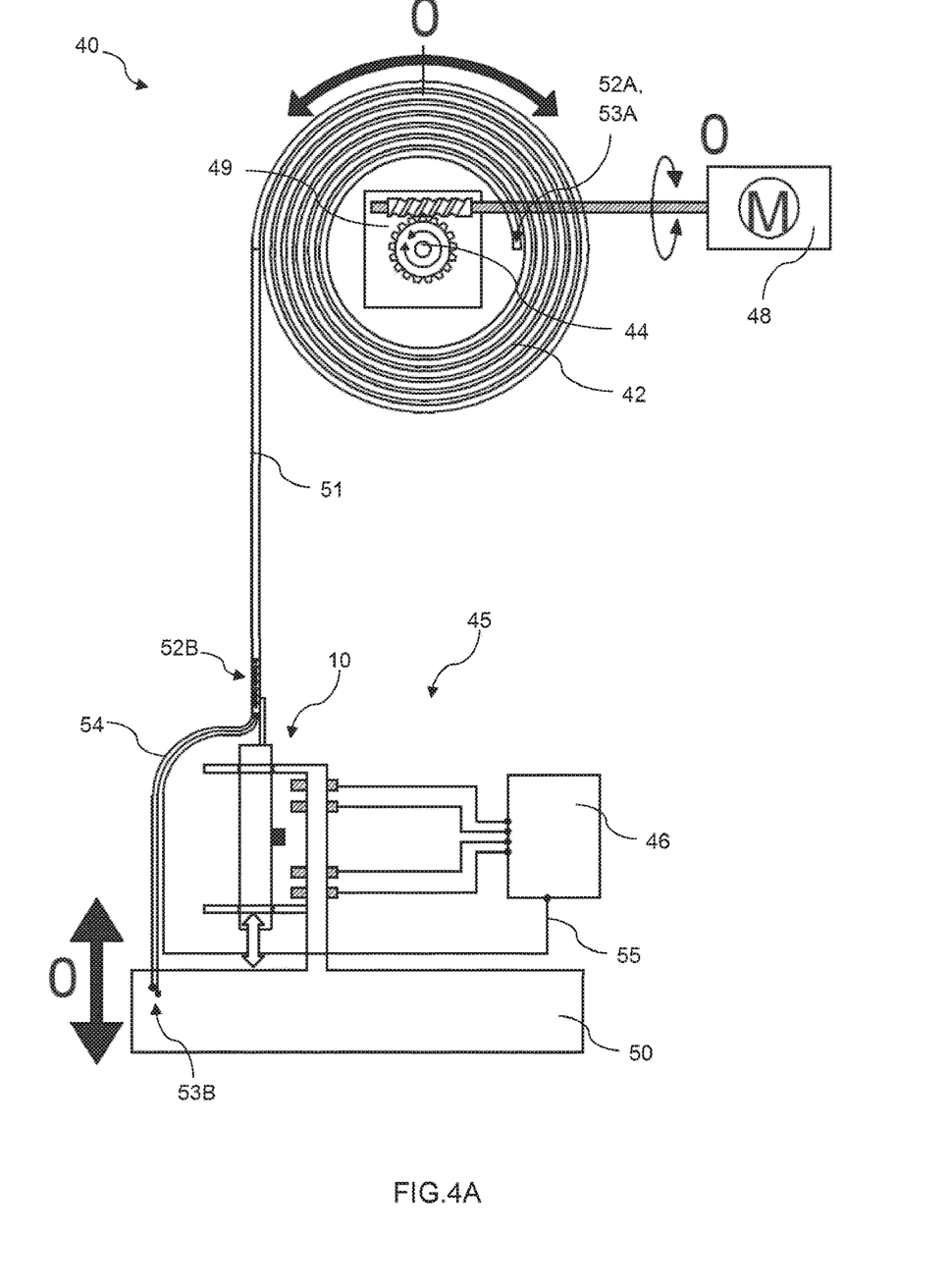
FIGS. 4A-4C show diagrammatic side views of a further apparatus for winding up and unwinding in accordance with the second aspect, for example for use on an underground works tool.
Figure 4B:
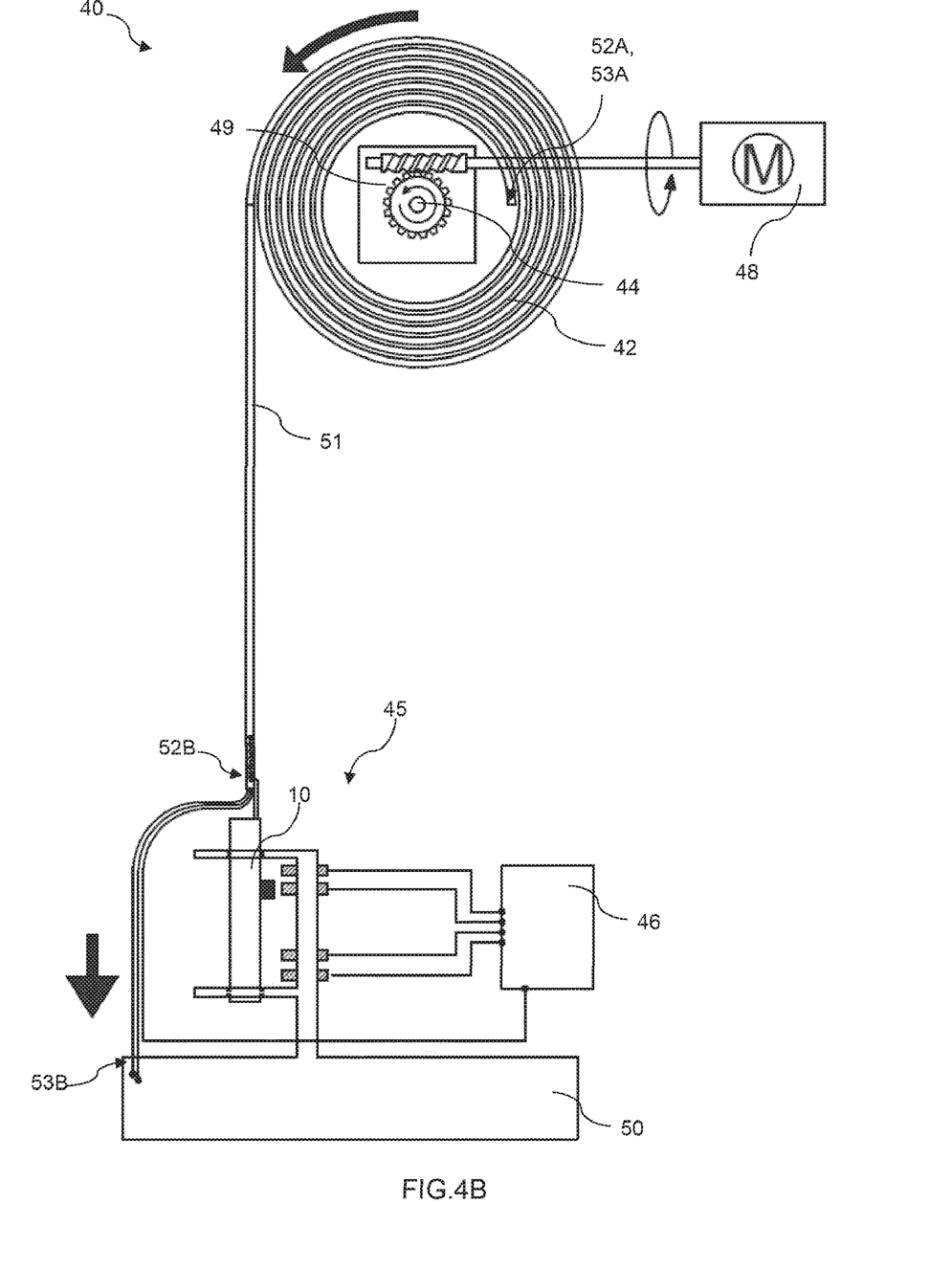
Figure 4C:
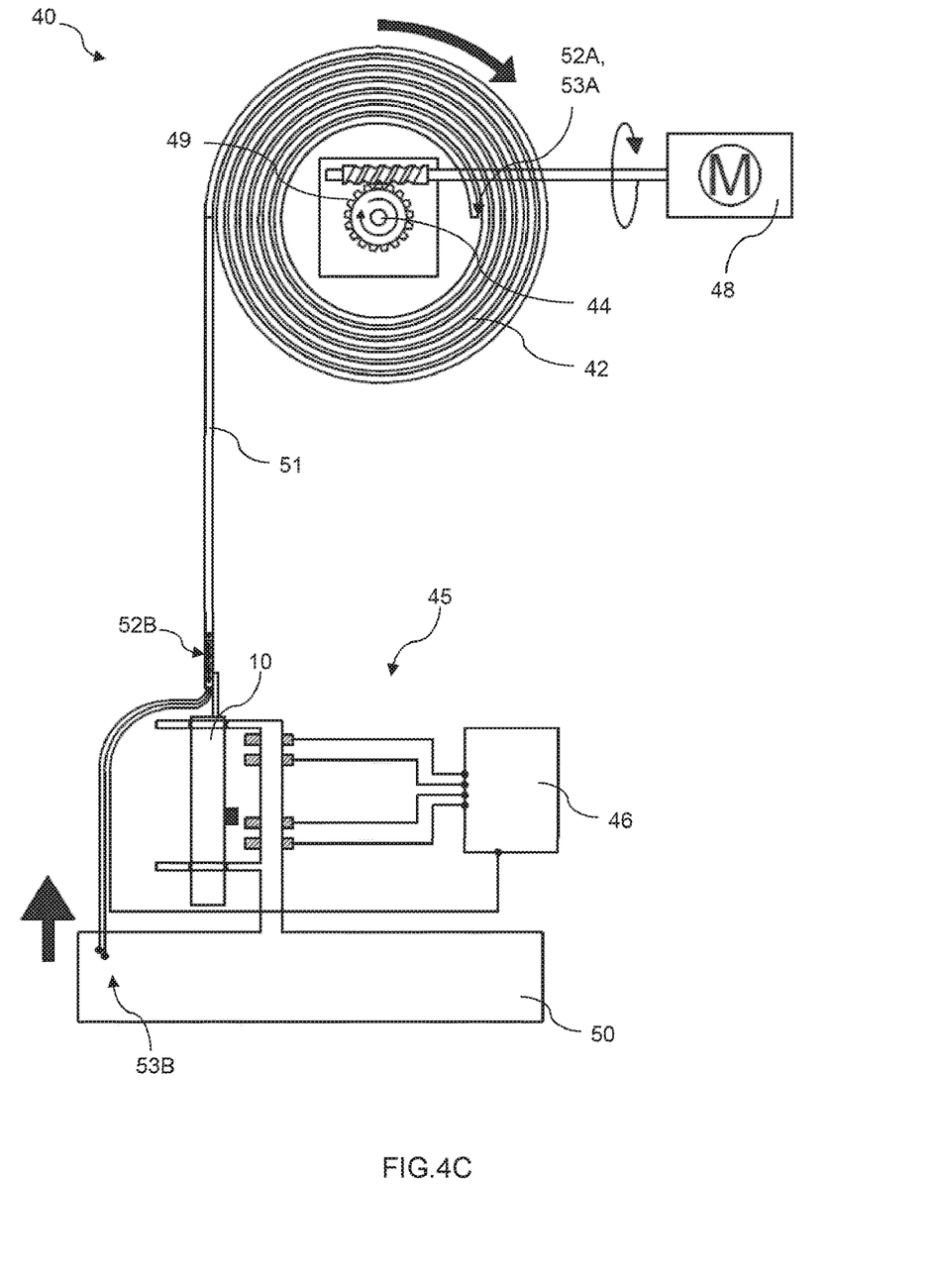

FIGS. 4A-4C show an apparatus 40 for vertically winding up and unwinding an energy guide chain 51, for protected guidance of supply lines 54, for example for an underground works tool, between a first connecting location 53A and a second connecting location 53B which is moveable relative thereto, on a load 50. The apparatus 40 is constructed in accordance with a similar principle to the apparatus 30 in FIG. 3 and includes in particular a sensor unit 45 with a movement sensor 10 as shown in FIG. 1, wherein the guide is mounted stationarily to the load 50 and the slider is mounted stationarily to the moveable end region 52B of the energy guide chain 51. The arrangement can also be reversed.

The apparatus 40 shown in FIGS. 4A-4C has an electric motor 48 as the drive for assisting with the upward and/or retraction movement of the energy guide chain 51 and for driving the rotatable drum 52. The sensor unit 45 detects the direction of movement of the load 50, by means of the movement sensor 10. As a comparison of FIG. 4B and FIG. 4C with the rest condition in FIG. 4A shows the one pick-up 13 will respond when the load 50 moves downwardly and the other pick-up 14 will respond when the load 50 moves upwardly. Accordingly, the control unit 46 actuates the drum drive 48 by way of the signal line 55 in order to wind up the energy guide chain 31 (FIG. 4C) or to unwind it (FIG. 4B). In that case, by virtue of the configuration of the movement sensor 10, the energy guide chain 31 can substantially follow the movement of the load. If a breakdown should occur, for example by the energy guide chain 31 becoming caught, the control unit 46 can detect that by virtue of the limit switches 16, 17 and possibly trigger an emergency stop of the load 50, for example by the control unit stopping a cable winch for the underground works tool.

FIGS. 4A-4C also shows a self-locking worm transmission which is connected at the drive side to the drum drive 48 and which at the drive output side drives the drum shaft 44, that is to say the shaft of the drum 42. Uncontrolled freewheeling is prevented in that way.

Unlike the situation shown in FIGS. 4A-4C the control unit 46 can also be arranged at the drum drive 48, that is to say on the stationary side of the energy guide chain 31.

Figure 5:
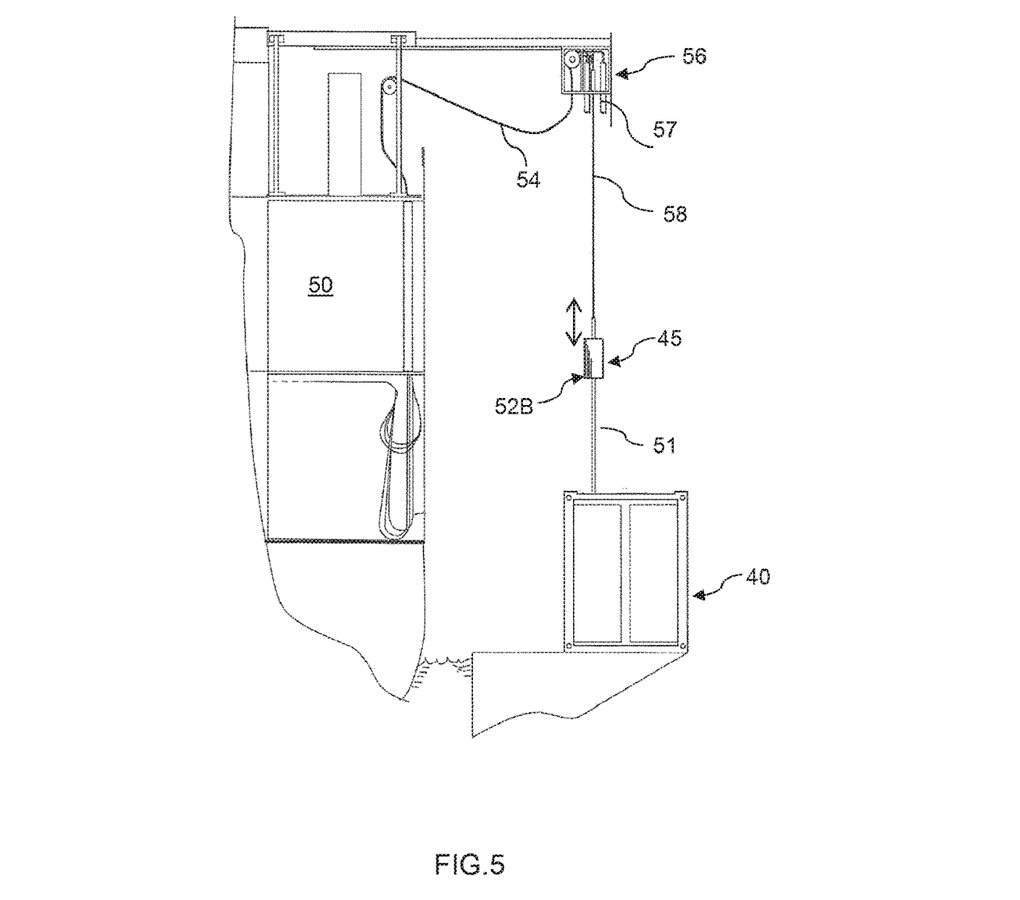
FIG. 5 shows a diagrammatic view of the use of an apparatus for winding up and unwinding a line guide device, for example as shown in FIG. 3 or FIGS. 4A-4C, for the purposes of shore power supply for a ship.

FIG. 5 shows a further example of use of the apparatus 40, for example as shown in FIGS. 4A-4C, for the power supply to an ocean-going ship 50 as the load. For providing the shore power/alternative maritime power for the ship 50 the apparatus 40 (not shown in detail here) is provided in a standard container which in FIG. 5 by way of example is set up directly at the quayside of a port. The ship 50 has a jib arm with cable winch 56, with a steel cable 58 and a crane hook (not shown) for lifting up and lowering a combined coupling and sensor unit 45 of the apparatus 40. For connecting the electric supply lines 54 of the ship 50 to the supply lines delivered by the energy guide chain 51 (see FIGS. 4A-4C), arranged near the cable winch 56 is a coupling device 57, for example for making a plug connection, on the jib arm of the ship 50. The end region 52B of the energy guide chain 51, as described with reference to FIGS. 4A-4C, is mounted floatingly within the coupling and sensor unit 45 and is operatively connected to a movement sensor (see FIGS. 4A-4C).

The mode of operation of the arrangement shown in FIG. 5 is described in respect of the forces in correspondingly reversed relationship with FIGS. 4A-4C, wherein the drum drive here too operates in conjunction with the drive of the cable winch 56. The structure of the apparatus 40 is adapted to the reversed force conditions, otherwise it is similar to the arrangement described with reference to FIGS. 4A-4C. If the combined coupling and sensor unit 45 is raised by the cable winch 56, the drum drive of the apparatus 40 switches on and extends the energy guide chain 51 until it latches to the coupling device 57 of the ship 50 and connects to the supply lines 54. The cable winch 56 stops at that moment, which causes the drum drive to switch off. Uncoupling, return movement and winding of the energy guide chain 51 into the container of the apparatus 40 take place in a correspondingly reversed fashion, with the energy guide chain 51 being automatically wound on to the drum (FIGS. 4A-4C).

As an alternative to the embodiment shown in FIG. 5 the apparatus 40 can also be arranged on the ship 50, in particular a container ship, itself, in which case the motor-assisted and sensor-controlled apparatus 40 is used for extending or retracting the energy guide chain 51 from the ship to the mooring pier, with the mode of operation and structure being identical as described with reference to FIG. 3 or FIGS. 4A-4C.

Typical power consumptions for shore power supply, for example for container or cruise ships, are in the region of some megawatts (MW) with three phases. Therefore, suitable supply lines are of an extremely high weight. Thus, the motor-assisted and sensor-controlled arrangement for line guidance can be used to particular advantage for shore power supply.

LIST OF REFERENCES

FIG. 1
10 movement sensor
11 guide
12 slider
13 first pick-up
14 second pick-up
15 triggering element
16, 17 limit switch
L longitudinal direction
FIG. 2
20 movement sensor
21 guide
22 slider 23 first pick-up
24 second pick-up
25 triggering elements
28, 29 end abutments
L longitudinal direction
FIG. 3
30 winding apparatus
31 energy guide chain
32 drum
33 spiral band
34 drum shaft
35 sensor unit
36 control unit
38 electric motor
FIGS. 4A-4C
10 movement sensor
40 winding apparatus
42 drum
44 drum shaft
45 sensor unit
46 control unit
48 electric motor
49 worm transmission
50 load
51 energy guide chain
52A, 52B end regions
53A, 53B connecting locations
54 supply lines
55 signal lines
FIG. 5
40 winding apparatus
45 sensor and coupling unit
50 ship (load)
51 energy guide chain
52B end regions
54 supply lines
56 cable winch
57 coupling device
58 steel cable

The invention claimed is:

1. A line guide device comprising a movement sensor, wherein the line guide device (31, 51) is adapted for the protected guidance of lines, cables or hoses between a first connecting location and a second connecting location moveable relative thereto, the line guide device having a moveable end at the second connecting location and a stationary end at the first connecting location;
wherein the movement sensor (10; 20) is configured for detecting a movement parameter that indicates a direction of movement of the moveable end of the line guide device and has a bearing having a first component and a second component moveable relative thereto, and includes at least one pick-up (13, 14; 23, 24) whose output signal depends on the position of the second component in relation to the first component so as to indicate the direction of movement of the moveable end of the line guide device;
the movement sensor (10; 20) is arranged
with the first component at the second connecting location, and with the second component at the corresponding moveable end of the line guide device; or
with the second component at the second connecting location and with the first component at the corresponding moveable end of the line guide device.

2. The line guide device according to claim 1, wherein the at least one pick-up (13, 14; 23, 24) is mounted to a slider or to a guide.

3. The line guide device according to claim 1, wherein there are provided two pick-ups including a first contact-free proximity switch and a second contact-free proximity switch (13, 14; 23, 24) at a spacing in the longitudinal direction.

4. The line guide device according to claim 1, wherein the movement sensor (10) additionally includes two limit switches (16, 17) at mutually opposite ends of a guide or a slider respectively to indicate the attainment of a maximum longitudinal displacement.

5. The line guide device according to claim 4, wherein the movement sensor (10; 20) is connected to a control unit (36; 46) that actuates a drive (38; 48) for assisting the line guide device as an adjusting member, and triggers an emergency stop of a moveable load which includes the second connecting location if the movement sensor indicates the attainment of a maximum longitudinal displacement; or wherein the movement sensor mechanically couples the second connecting location to the moveable end of the line guide device and for that purpose has in particular at the guide or at the slider two end abutments (28, 29) for limiting the maximum longitudinal displacement.

6. The line guide device according to claim 1, wherein the movement sensor is connected to a control unit (36; 46) which actuates an adjusting member.

7. The line guide device according to claim 6, wherein signal lines (55) for connecting the movement sensor (10) to the control unit (46) and/or the adjusting member are guided through the line guide device to the stationary end thereof.

8. The line guide device according to claim 1, wherein said bearing is a linear bearing including the first component, which is a guide (11; 21), and comprising the second component, which is a slider (12; 22) displaceable in the guide in a longitudinal direction (L), and wherein the output signal of said at least one pick-up (13, 14; 23, 24) depends on the position of the slider relative to the guide.

9. The line guide device according to claim 1, wherein said line guide device is an energy guide chain.

10. An arrangement for line guidance comprising:
an energy guide chain (31; 51) for the protected guidance of lines (54, 55) between a first connecting location and a second connecting location moveable relative thereto at a load, the energy guide chain (31; 51) having a first end region (52A) at the first connecting location and a moveable second end region (52B) at the second connecting location;
a drive (38, 48) operatively connected to the energy guide chain for assisting with a forward and/or return movement of the energy guide chain;
a control unit (36; 46) for actuating the drive;
a sensor unit (35, 45) including a movement sensor (10; 20) for detecting a movement parameter that indicates at least a direction of movement of the moveable second end region (52B) of the energy guide chain, the movement sensor (10; 20) is at the moveable second end region (52B) of the energy guide chain,
wherein the control unit (36; 46) is connected to the sensor unit (35; 45) and to the drive (38; 48) and actuates the drive on the basis of an output signal of the movement sensor (10; 20), the output signal being indicative of at least the direction of movement of the moveable second end region (52B) of the energy guide chain.

11. The arrangement for line guidance according to claim 10, wherein a forward and/or return movement of the energy guide chain (31) is effected substantially in a horizontal direction, the energy guide chain forms a lower run, and direction-changing arc and an upper run and the drive assists with the travel movement of the upper run and/or the direction-changing arc.

12. The arrangement for line guidance according to claim 10, wherein
the movement sensor (10; 20) having a guide (11; 21), a slider (12; 22) longitudinally displaceable in the guide and at least one pick-up (13, 14; 23, 24) whose output signal depends on the position of the slider relative to the guide, and
the movement sensor is arranged with the guide stationary at the load (50) and with the slider stationary at the moveable end region (52B) or with the guide stationary at the moveable end region and with the slider stationary at the load.

13. The arrangement for line guidance according to claim 10, wherein said lines include at least one cable or at least one hose.

14. The arrangement for line guidance according to claim 10, wherein said load comprises a movable machine component or a movable tool.

15. An apparatus (30; 40) for winding up and unwinding a line guide device, the apparatus comprising:
a line guide device (31; 51) for the protected guidance of lines, cables, and hoses between a first connecting location (53A) and a second connecting location (53B) moveable relative thereto at a load;
a rotatably mounted drum (32; 42) for winding up and unwinding the line guide device, wherein the line guide device (31; 51) includes a drum-side end region (52A) fixed to the drum and a load-side end region (52B) that is moveable in accordance with winding up and unwinding the line guide device onto and off the drum (32; 42), respectively;
a drum drive (38; 48) for rotating the drum;
a sensor unit (35; 45) including a movement sensor (10; 20) at the moveable load-side end region (52B) of the line guide device, the movement sensor (10; 20) being configured for detecting a direction of movement of the moveable load-side end region (52B) of the line guide device; and
a control unit (36; 46) connected to the sensor unit (35; 45) and the drum drive for actuating the drum drive in accordance with the detected direction of movement of the moveable load-side end region (52B).

16. The apparatus according to claim 15, wherein the sensor unit (35; 45) includes a movement sensor (10; 20) having a guide, a slider displaceable in the guide in the longitudinal direction (L) and at least one pick-up whose output signal depends on the position of the slider relative to the guide.

17. The apparatus according to claim 15, wherein the control unit (36; 46) actuates the drum drive (38; 48) in regard to the direction of rotation and the rotational speed to provide closed-loop or open-loop control thereof.

18. The apparatus according to claim 15, wherein the drum drive has an electric motor (48) and a self-locking transmission (49) that is connected thereto at the drive side and that is connected at the output side to the drum shaft.

19. The apparatus according to claim 18, wherein the transmission is a worm transmission (49).

20. Use of the apparatus according to claim 15 for the shore power supply of a ship, wherein the line guide device includes an energy guide chain (51) that guides heavy-current cables for the shore power supply.

21. Use of the apparatus according to claim 15 for the supply of a vertically displaceable underground works tool, wherein the underground works tool having the second connecting location is carried by a draw cable of a winch and moves predominantly vertically up and down by means of a winch drive and the drum drive follows the winch drive.

22. The apparatus according to claim 15, wherein said line guide device is an energy guide chain.

23. The apparatus according to claim 15, wherein said load includes a moveable machine component.

* * * * *